J.C. Hall,
Water Spout,
No. 104,450. Patented June 21, 1870

Witnesses:
C. T. Cook
Otto L. Johnson

Inventor:
Jerry C. Hall

United States Patent Office.

JAMES C. HALL, OF BATTLE CREEK, MICHIGAN.

Letters Patent No. 104,450, dated June 21, 1870.

RAIN-WATER CONDUCTOR AND FILTER.

The Schedule referred to in these Letters Patent and making part of the same

*To all whom it may concern:*

Be it known that I, JAMES C. HALL, of the city of Battle Creek, in the county of Calhoun and State of Michigan, have invented a new and improved Self-adjusting Rain-water Conductor and Filterer; and I do hereby declare that the following is a full, clear, and exact description of the same, reference being had to the annexed drawings, making a part of this specification, in which—

Similar letters of reference indicate like parts in both figures.

Figure 1:
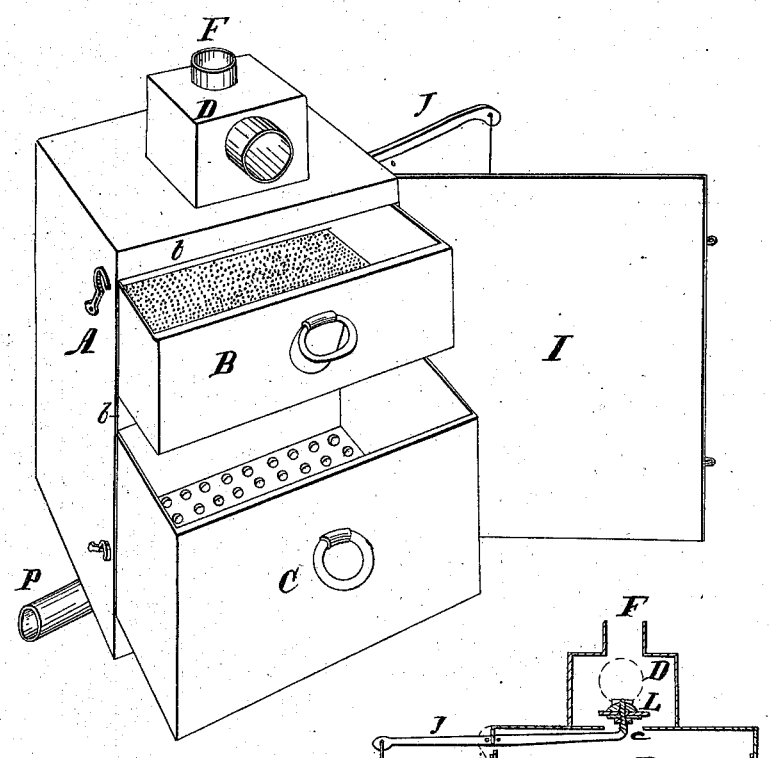
Figure 1 is a perspective view of the apparatus, exhibiting the straining and filtering compartments as partially drawn out.
Figure 2:
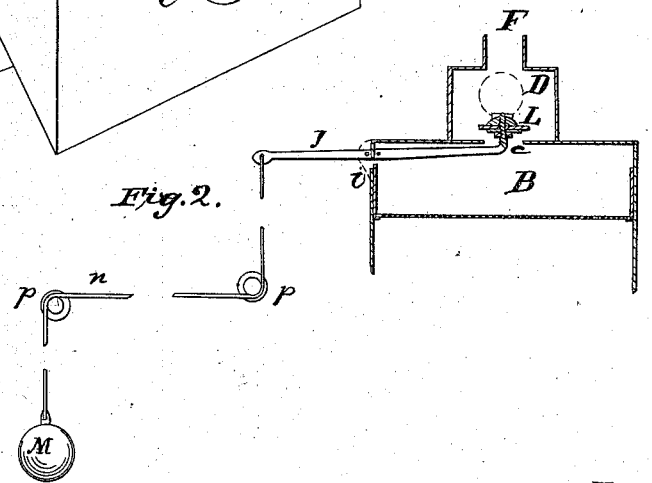
Figure 2 is a partial vertical section through the self-adjusting valve.

My arrangement relates to an improved apparatus for conducting rain-water to cisterns or other reservoirs in a strained and filtered state, having a self-adjusting tension and float arrangement, with a flexible connection that permits all surplus water to run to waste, at any required distance from the said reservoir, whenever it is filled up to the adjusted capacity; and To enable others skilled in this particular branch to construct my invention, I will now proceed to describe it.

A is a rectangular case, open on one side, and fitted with narrow partition bars, $b$, and guides (not shown) to receive the two draw compartments B and C, to be presently described.

D is a smaller casing, formed on top of A, and furnished with a vertical branch-pipe, F, as seen, to connect with the rain-water conductor leading from the roofs, or elsewhere; also, with a side branch-pipe, G, for the escape of the surplus or waste water.

The two casings A and D do not communicate with each other, except through a valve-opening, $e$, so situated, in relation to the inlet F, that the water will not fall upon the valve.

The draw B has its bottom constructed so as to strain the water before it passes into the filtering-draw C, underneath it, which may be done by making it of suitable wire-cloth, or of sheet metal perforated sufficiently fine to keep back the accumulations of earthy and vegetable matter which would tend to clog the filter aforesaid.

The bottom of the filter-draw C should also be perforated, but with larger apertures, as seen, and the draw is filled with any suitable filtering material of sufficient porosity.

I leave a space usually between the filter bottom and the bottom of the case A, to which the pipe P, that conducts the filtered water to the cistern, is connected.

The cases and draws are best made of non-corrosive sheet metal, otherwise they must be protected by a coating of some material that will not injure the water, and I usually protect the interior of the case by a hinged door, (shown open at I,) which shuts over the draws, and may be hooked or locked to one of the sides of the case.

L is the valve, to open and close the aperture $e$, usually of the common disk kind, made adjustable, as shown, on the bent threaded end of a horizontal bar, J, pivoted to ears at or about the point $i$, so that the valve will be closed by gravity, except when over-balanced by the weight of the float suspended at high-water line.

The float, seen at M, is connected to the outer end of the valve-bar by a cord or flexible wire, $n$, which may be led around any angle by the aid of pulleys, as seen at $p$, and thus operate the valve automatically at any required distance from the cistern.

The rain-water passes first down the pipe F into the case D, and as the valve L is up always, by reason of the preponderating weight of the float M, suspended in the cistern, the water passes through the strainer bottom into the filter in the draw compartment C, from which it passes purified through the pipe P into the cistern.

When the water reaches the float M, so as to buoy it up and relieve the tension on the cord, the valve will fall on its seat, and the surplus water will escape through the waste outlet or pipe at G.

The valve will, of course, be lifted whenever the water is so lowered in the cistern as to permit the float to operate as a mere suspended weight.

My improved arrangement is equally useful and efficacious, whether it is designed to use the rain-water filtered by it for drinking, or for other domestic uses.

In the latter case it might be well to use a more porous and free filter, sufficient to remove such coarse extraneous matter as will leave the water so pure that it will not deposit any sediment, and will continue inodorous; but in any case, should the water not pass through the filter as fast as it is received from the roofs, the overflow will pass off through the waste-pipe.

In my arrangement, the convenience afforded for emptying the strainer compartment, and for renewing the filter, will insure its being frequently done, and the self-adjusting arrangement of the valve, cord, and float-weight, permits locating the filter at the most convenient point for the rain supply and escape of surplus water, without special reference to the position of the cistern.

I am aware that a patent, dated December 17, 1867, was granted J B. Hudson for a rain-conductor, which strained the water, and received and expelled it by means of an oscillating disk, connected by a rigid rod to a float, which operated by buoyancy alone; but a filter could not be introduced into this conductor without an entire change of construction, and, besides, to be operative, it must be placed immediately over the cistern without reference to the point of supply and waste, which is entirely different from mine.

What I claim as my invention, and desire to secure by Letters Patent, is as follows:

1. The arrangement and combination of the two draw compartments B and C with the casings A and D, when said casings communicate with each other and with the cistern, and are provided with supply and waste-pipes F G, and when the compartments are fitted and provided to strain and filter the water that passes through, substantially in the manner and for the purpose specified.

2. In combination with the parts mentioned in the first clause of the claim, the lever J, carrying the valve L, and operated as described, when arranged as shown, with relation to the casing A, drawer B, valve-seat e, compartment D, induction and overflow pipes F G, all as and for the purpose set forth.

Given under my hand September 4, 1869.

JAMES C. HALL.

Witnesses:
 O. T. COOK,
 OTTO LEE JOHNSON.